United States Patent
Tanaka et al.

(10) Patent No.: US 6,754,172 B1
(45) Date of Patent: Jun. 22, 2004

(54) NON-INTERRUPTIVE PROTECTION SWITCHING DEVICE AND NETWORK SYSTEM USING THE SAME

(75) Inventors: Masayuki Tanaka, Kanagawa (JP); Masaki Kubo, Kanagawa (JP); Satoshi Nemoto, Kanagawa (JP); Shuji Sakakura, Kanagawa (JP); Shigeo Handa, Kanagawa (JP); Yuji Kamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 794 days.

(21) Appl. No.: 09/723,116

(22) Filed: Nov. 27, 2000

(30) Foreign Application Priority Data

Jan. 31, 2000 (JP) ...................................... 2000-027171

(51) Int. Cl.[7] .................................................. H04J 3/06
(52) U.S. Cl. ...................... 370/217; 370/221; 379/1.03; 714/2
(58) Field of Search ................................. 370/216, 217, 370/221, 222, 223, 225; 379/1.01, 1.03, 9; 714/100, 1, 2, 25, 47

(56) References Cited

U.S. PATENT DOCUMENTS

| | | | | |
|---|---|---|---|---|
| 4,677,614 A | * | 6/1987 | Circo | 370/222 |
| 5,475,676 A | * | 12/1995 | Takatori et al. | 370/217 |
| 5,572,513 A | * | 11/1996 | Yamamoto et al. | 370/217 |
| 5,644,567 A | * | 7/1997 | Ikeda | 370/225 |
| 5,872,780 A | * | 2/1999 | Demiray et al. | 370/359 |
| 6,122,249 A | * | 9/2000 | Mochizuki et al. | 370/220 |
| 6,587,527 B1 | * | 7/2003 | Tani et al. | 375/357 |

FOREIGN PATENT DOCUMENTS

| | | |
|---|---|---|
| JP | 06061984 | 3/1994 |
| JP | 09224019 | 8/1997 |
| JP | 10013390 | 1/1998 |

OTHER PUBLICATIONS

Iselt A new synchronization algorithm for hitless protection switching in ATM networks Performance, Computing and Communications Conference, 1999. IPCCC '99. IEEE International, Feb. 10–12, 1999 pp.: 370–376.*

* cited by examiner

*Primary Examiner*—Hassan Kizou
*Assistant Examiner*—Dmitry Levitan
(74) *Attorney, Agent, or Firm*—Katten Muchin Zavis Rosenman

(57) ABSTRACT

A non-interruptive protection switching device which performs protection switching in a more efficient and robust way. The device has a working-channel signal storage unit to store data signals received through a working channel. Multiframe synchronization timings are detected by a working-channel multiframe synchronization controller, which provides a working-channel multiframe sync detection pulse signal when the main signals are in a normal condition and stops it when the channel is disrupted. A working-channel write controller controls every write access to the working-channel signal storage unit, generating a write pulse signal therefor. The working-channel write controller also produces working-channel write phase data by identifying a phase difference of the detected multiframe synchronization timing with respect to a reference phase signal. The generation of this write pulse signal is based on the multiframe sync detection pulse signal when the working-channel multiframe sync detection pulse signal is available, or on a free-running timebase when it is stopped. The stored data in the working- and protection-channel signal storage units are read out simultaneously, under the control of a read controller which produces read pulses from the write phase data.

16 Claims, 14 Drawing Sheets

NON-INTERRUPTIVE PROTECTION SWITCHING DEVICE AND NETWORK SYSTEM USING THE SAME

BACKGROUND OF THE INVENTION

1. Field of the Invention

The present invention relates to a non-interruptive protection switching device and a network system. More particularly, the present invention relates to a non-interruptive protection switching device which instantaneously switches data traffic from working channels to protection channels, as well as to a network system which employs east and west transmission subsystems with non-interruptive protection switching capabilities.

2. Description of the Related Art

Synchronous Digital Hierarchy (SDH) and Synchronous Optical Network (SONET) transmission systems are widely used as the core technology in today's telecommunication infrastructures. In general, SDH/SONET transmission systems are configured with a multiple redundant architecture to provide higher reliability and availability. When a problem occurs with a working channel, the system will immediately switch the traffic signals from the failed channel to a protection channel, thereby preventing the communication from being disrupted. This protection switching function is referred to as "non-interruptive switchover."

Since the working and protection channels have different propagation delay characteristics, there is a need for the phase synchronization of signal frames at the receiving end to make non-interruptive switchover operations possible. FIG. 14 briefly explains how a conventional transmission unit performs this phase adjustment. The transmission unit receives a stream of frames F1 through the working channel, as well as F2 through the protection channel. Note that the protection-channel frames F2 arrive at the unit with a delay time of t1 with respect to the working-channel frames F1. This phase difference between F1 and F2 must be eliminated when the transmission unit performs a protection switching operation. As FIG. 14 shows, the non-interruptive protection switching facility of the unit adjusts their phases and sends out the resultant in-phase frame signals F1a and F2a through its working and protection facilities, with a delay time of t2 after the reception of F2. The delay time t2 has to be determined considering various parameters including: the time required for line switching after failure detection, and an extra delay time resulting from additional equipment placed on the transmission line. In this way, the conventional transmission unit switches from one transmission subsystem to another without disrupting the traffic when a failure occurs.

The conventional non-interruptive protection switching device, however, is not robust enough to cope with possible variations in the phase of incoming frames, which may occur suddenly for some reason. In such a problem situation, its internal control operation to read frame data would be adversely affected by the phase variation, resulting in main signal errors.

Another problem with the conventional non-interruptive protection switching devices is that, when the transmission clock was lost, they would do nothing but reporting that failure to the operator. That is, the conventional devices lack the ability to properly handle such clock loss faults not to disrupt its internal control.

Still another problem with the conventional devices is their inability to handle concatenated payloads carrying large-capacity signals. That is, they are not flexible enough to control write and read operations in various multiplex modes using concatenation techniques. To realize such different multiplex modes in a conventional device, more complex circuitry would be necessary.

SUMMARY OF THE INVENTION

Taking the above into consideration, an object of the present invention is to provide a non-interruptive protection switching device which performs protection switching in a more efficient and robust way to provide a higher quality communication service.

It is another object of the present invention to provide a network system which performs protection switching in a more efficient and robust way to provide a higher quality communication service.

To accomplish the first object, according to the present invention, there is provided a non-interruptive protection switching device which switches data traffic from working channels to protection channels. This non-interruptive protection switching device comprises a working-channel transmission controller, a protection-channel transmission controller, and a read controller.

The working-channel transmission controller comprises the following elements: a working-channel signal storage unit which stores data signals received through a working channel, where the data signals contain working-channel main signals for a multiframe interval; a working-channel multiframe synchronization controller which monitors multiframe patterns in the working-channel main signals to detect a multiframe synchronization timing thereof, provides a working-channel multiframe sync detection pulse signal when the working-channel main signals are in a normal condition, and stops the provision of the working-channel multiframe sync detection pulse signal when the working-channel main signals fall into a faulty condition; and a working-channel write controller which controls write access to the working-channel signal storage unit by providing a working-channel write pulse signal therefor, and produces working-channel write phase data by identifying a phase difference of the detected multiframe synchronization timing with respect to a reference phase signal. Here, the working-channel write pulse signal is produced from the multiframe sync detection pulse signal when the working-channel multiframe sync detection pulse signal is available, or from a free-running timebase when the working-channel multiframe sync detection pulse signal is stopped.

The protection-channel transmission controller comprises the following elements: a protection-channel signal storage unit which stores data signals received through a protection channel, where the data signals contain protection-channel main signals for a multiframe interval; a protection-channel multiframe synchronization controller which monitors multiframe patterns in the protection-channel main signals to detect a multiframe synchronization timing thereof, provides a protection-channel multiframe sync detection pulse signal when the protection-channel main signals are in a normal condition, and stops the provision of the protection-channel multiframe sync detection pulse signal when the protection-channel main signals fall into a faulty condition; and a protection-channel write controller which controls write access to the protection-channel signal storage unit by providing a protection-channel write pulse signal therefor, and produces protection-channel write phase data by identifying a phase difference of the detected multiframe synchronization timing with respect to a reference phase signal.

Here, the protection-channel write pulse signal is produced from the multiframe sync detection pulse signal when the protection-channel multiframe sync detection pulse signal is available, or from a free-running timebase when the protection-channel multiframe sync detection pulse signal is stopped.

The read controller produces a read pulse signal from the working-channel write phase data and the protection-channel write phase data, and based on the produced read pulse signal, reads out the stored data signals simultaneously from the working-channel signal storage unit and the protection-channel signal storage unit for use in downstream transmission.

Further, to accomplish the second object, according to the present invention, there is provided a network system which employs east and west transmission subsystems with non-interruptive protection switching capabilities. This network system comprises a plurality of transmission units, a transmission medium which interconnects the plurality of transmission units in ring form; and a plurality of non-interruptive protection switching devices. The non-interruptive protection switching device is disposed in each of the transmission units and comprises an east-channel transmission controller, a west-channel transmission controller, and a read controller.

The east-channel transmission controller comprises the following elements: an east-channel signal storage unit which stores data signals received through an east channel, where the data signals contain east-channel main signals for a multiframe interval; an east-channel multiframe synchronization controller which monitors multiframe patterns in the east-channel main signals to detect a multiframe synchronization timing thereof, provides an east-channel multiframe sync detection pulse signal when the east-channel main signals are in a normal condition, and stops the provision of the east-channel multiframe sync detection pulse signal when the east-channel main signals fall into a faulty condition; and an east-channel write controller which controls write access to the east-channel signal storage unit by providing an east-channel write pulse signal therefor, and produces east-channel write phase data by identifying a phase difference of the detected multiframe synchronization timing with respect to a reference phase signal. Here, the east-channel write pulse signal is produced from the multiframe sync detection pulse signal when the east-channel multiframe sync detection pulse signal is available, or from a free-running timebase when the east-channel multiframe sync detection pulse signal is stopped.

The west-channel transmission controller, on the other hand, comprises the following elements: a west-channel signal storage unit which stores data signals received through a west channel, where the data signals contain west-channel main signals for a multiframe interval; a west-channel multiframe synchronization controller which monitors multiframe patterns in the west-channel main signals to detect a multiframe synchronization timing thereof, provides a west-channel multiframe sync detection pulse signal when the west-channel main signals are in a normal condition, and stops the provision of the west-channel multiframe sync detection pulse signal when the west-channel main signals fall into a faulty condition; and a west-channel write controller which controls write access to the west-channel signal storage unit by providing a west-channel write pulse signal therefor, and produces west-channel write phase data by identifying a phase difference of the detected multiframe synchronization timing with respect to a reference phase signal. Here, the west-channel write pulse signal is produced from the multiframe sync detection pulse signal when the west-channel multiframe sync detection pulse signal is available, or from a free-running timebase when the west-channel multiframe sync detection pulse signal is stopped.

The read controller produces a read pulse signal from the east-channel write phase data and the west-channel write phase data, and based on the produced read pulse signal, reads out the stored data signals simultaneously from the east-channel signal storage unit and the west-channel signal storage unit for use in downstream transmission.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described below with reference to the accompanying drawings.

Figure 1:
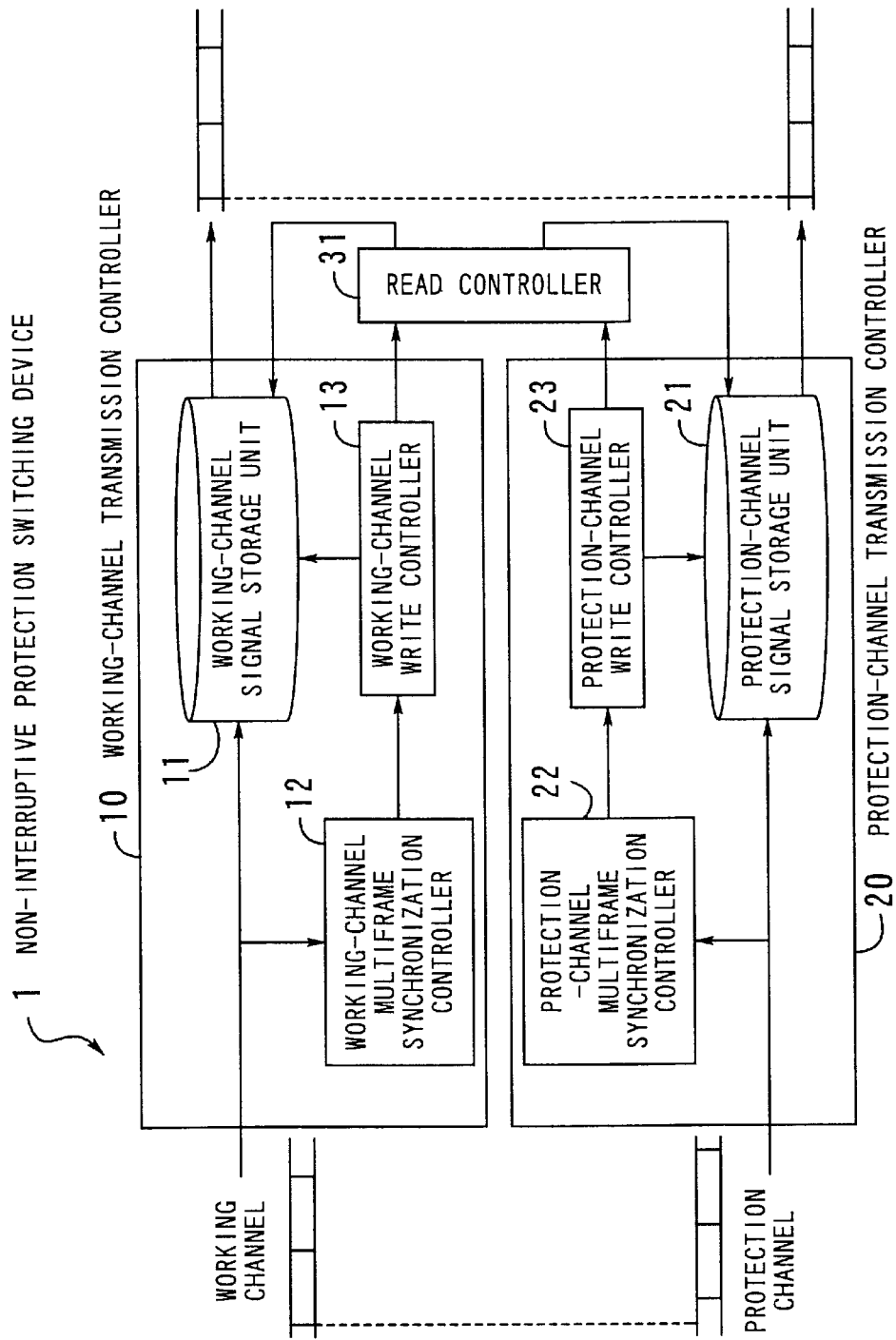
FIG. 1 is a conceptual view of a non-interruptive protection switching device according to the present invention.

FIG. 1 is a conceptual view of a non-interruptive protection switching device according to the present invention. The illustrated non-interruptive protection switching device 1 is designed to switch the path traffic from working channels to protection channels without disrupting the communication. The proposed non-interruptive protection switching device 1 comprises a working-channel transmission controller 10, a protection-channel transmission controller 20, and a read controller 31.

The working-channel transmission controller 10 comprises the following elements: a working-channel signal storage unit 11, a working-channel multiframe synchronization controller 12, and a working-channel write controller 13. The working-channel signal storage unit 11 stores data signals received through the working channel. The term "data signals" refers collectively to the main signals (i.e., user data part of the transmission signals) having a length of one multiframe, or 64 consecutive frames, and the alarm indication signals (AIS) signifying that upstream equipment has observed some deterioration in the signal being transmitted. The working-channel multiframe synchronization controller 12 detects multiframe synchronization timings by identifying each multiframe alignment pattern that indicates the head of a main signal stream. When the main signals are in a normal condition, the controller 12 provides a multiframe sync detection pulse signal (the term "sync" is used herein as a short form of "synchronization"). This signal, however, will be stopped if the main signals fall into a faulty condition and the traffic is disrupted.

The working-channel write controller 13 produces a write pulse signal according to the multiframe sync detection pulse signal so as to control data write operations to the working-channel signal storage unit 11. When multiframe sync detection pulse signal is lost, it supplies the working-channel signal storage unit 11 with similar write pulses generated in free running mode. Further, the working-channel write controller 13 identifies the relative phase of the multiframe sync detection pulse signal with respect to a certain reference signal supplied from an external source. The resultant information is referred to as the write phase data (described later).

The protection-channel transmission controller 20, on the other hand, comprises the following elements to process incoming signals received through the protection channel: a protection-channel signal storage unit 21, a protection-channel multiframe synchronization controller 22, and a protection-channel write controller 23. These protection-channel facilities operate similarly to their counterparts on the working channel. See the preceding paragraphs for their details.

The read controller 31 produces a read pulse signal for making access to the working-channel and protection-channel signal storage units 11 and 21, based on the write phase data supplied from the working-channel write controller 13 and the write phase data and reference phase signal supplied from the protection-channel write controller 23. The produced read pulses are used to retrieve outgoing data streams synchronously from the working-channel and protection-channel signal storage units 11 and 21.

According to the present invention, the non-interruptive protection switching device 1 permits the working-channel and protection-channel signal storage units 11 and 21 to operate in free-running mode when any anomaly is observed in the main signals, while stopping the provision of multiframe sync detection pulses to them. This mechanism effectively decouples the reading controller 31 from external disturbances, thus improving the robustness of protection switching operations. Suppose, for example, that a circuit board is hot swapped for maintenance at a terminal unit of a non-selected channel. This hot swapping, however, will never affect the operation of the proposed non-interruptive protection switching device 1.

Figure 2:
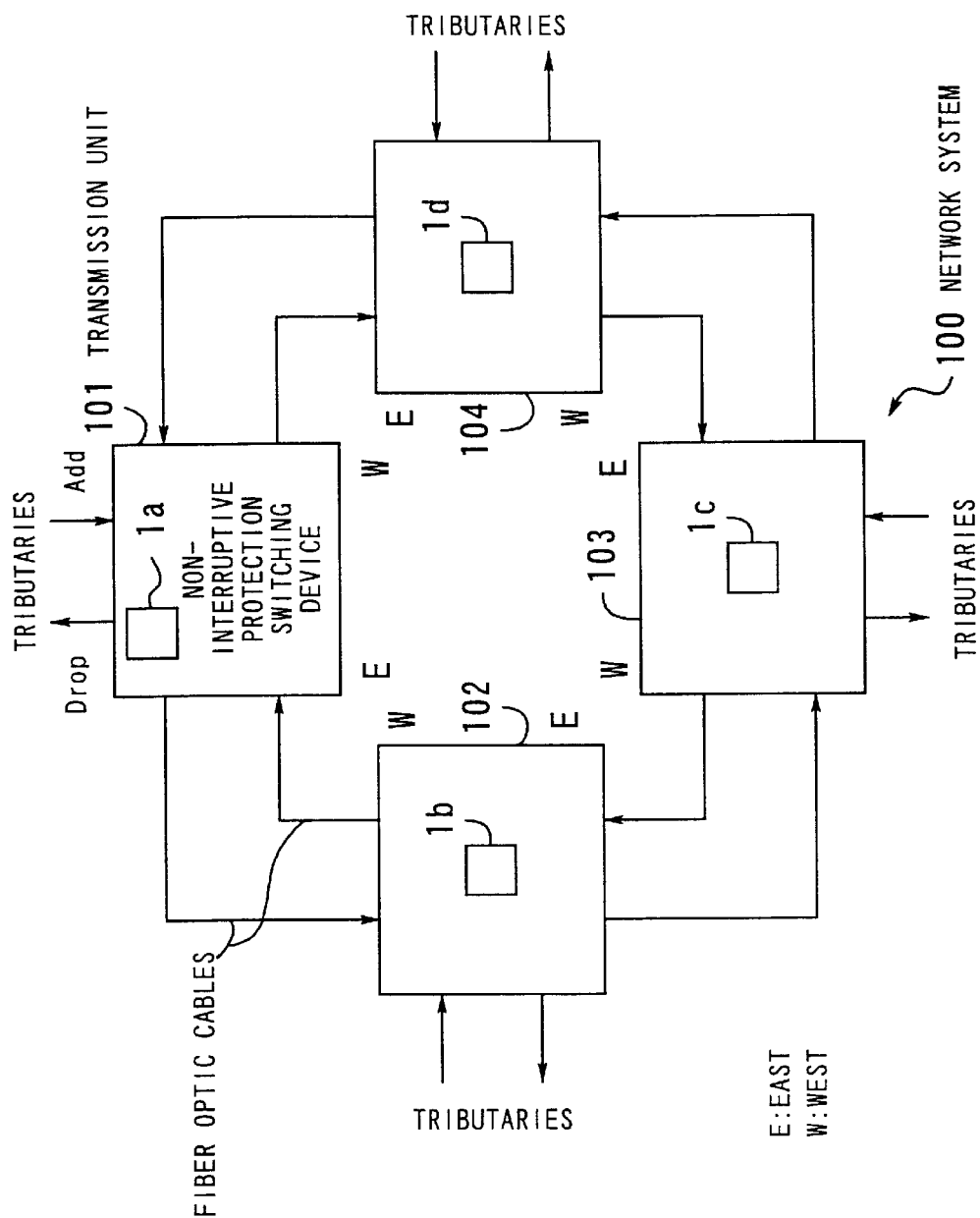
FIG. 2 is a diagram which shows a typical network configuration.

Referring now to FIG. 2, the next section will present a specific network system where the proposed non-interruptive protection switching device 1 is implemented. This network system 100 is organized by four transmission units 101 to 104. Fiber optic cables interconnect them, serving as physical transmission medium to form a dual ring network. The two ring directions being called "east" and "west."

To provide protection switching capabilities, each transmission unit 101 to 104 employs a non-interruptive protection switching device 1a to 1d. Take the non-interruptive protection switching device 1a, for example. It receives data signals from its east-side port and west-side port, which are slightly different in phase. Canceling this phase difference with its internal processing, the non-interruptive protection switching device 1a drops and sends a part of either signal to its tributary ports. The other three non-interruptive protection switching devices 1b to 1d function in the same way. The transmission units 101 to 104 also accept outgoing signals from their respective tributary equipment. These signals are added into the transmission signals of the dual ring network and transported in both the east and west directions.

In the next section, the detailed configuration and operation of the non-interruptive protection switching device 1a will be described.

Figure 3:
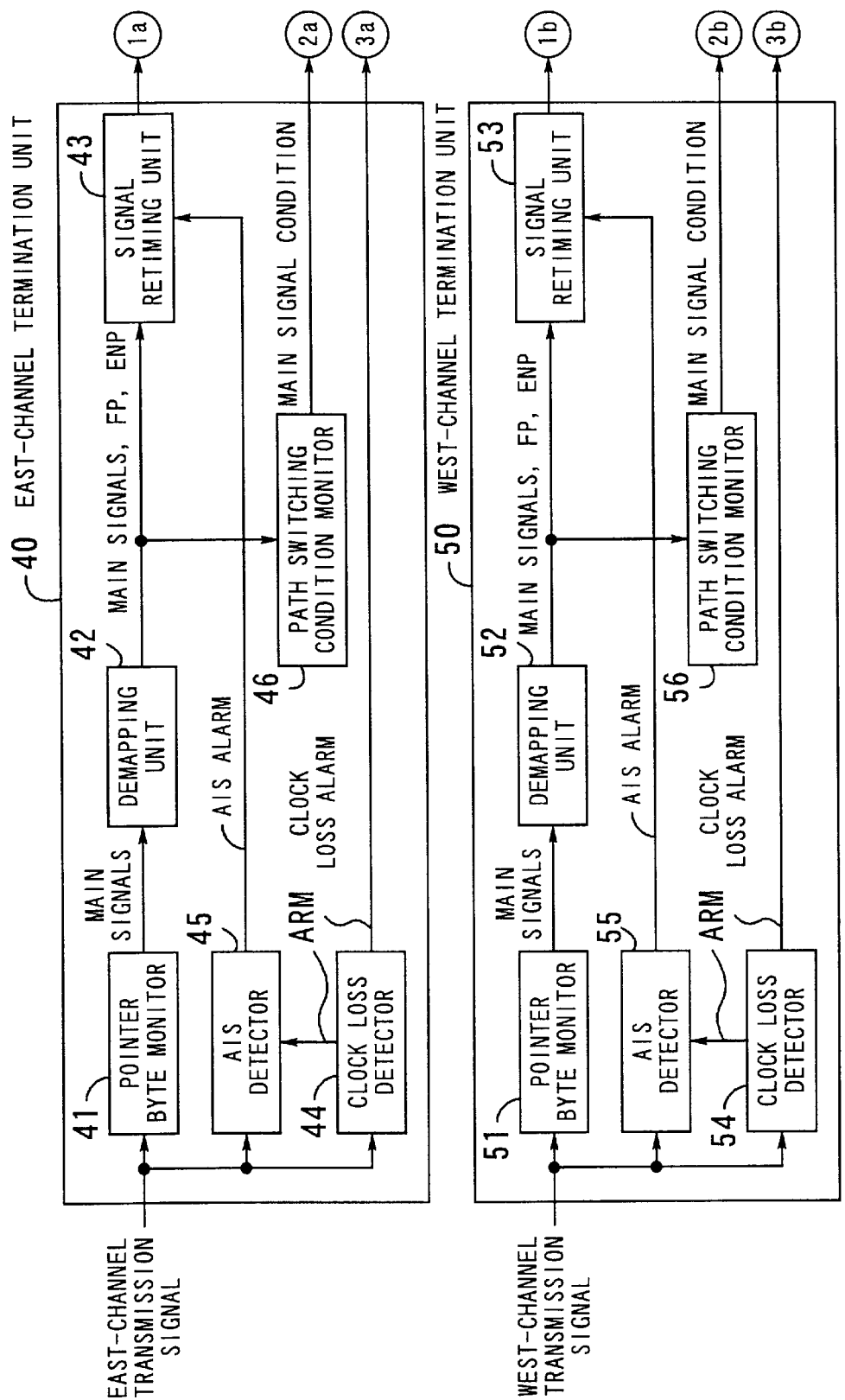
FIGS. 3 and 4 are diagrams which show the structure of a non-interruptive protection switching device according to the present invention.
Figure 4:
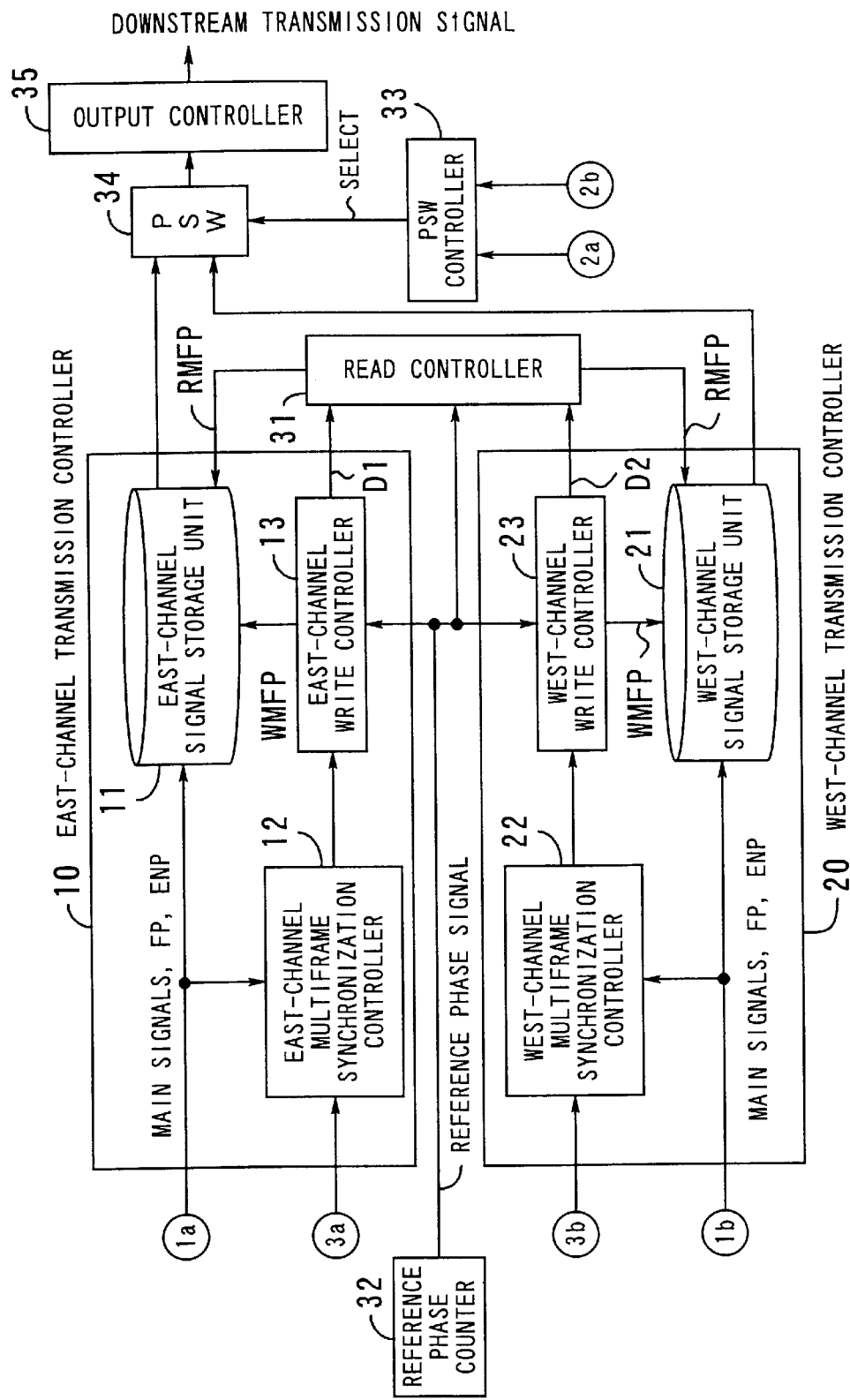

Referring to the block diagrams of FIGS. 3 and 4, the non-interruptive protection switching device 1a comprises two sets of transmission controllers 10 and 20 and termination units 40 and 50 to provide dual redundancy. The incoming transmission signal received from the east ring is processed by the east-channel termination unit 40 and east-channel transmission controller 10, while that from the west ring is processed by the west-channel termination unit 50 and west-channel transmission controller 20. The east and west channels refer to what have been described as the working and protection channels in FIG. 1. The following will mainly explain the east side subsystem, the content being applicable to the west side subsystem.

The east-channel termination unit 40 comprises the following elements: a pointer byte monitor 41, a demapping unit 42, a signal retiming unit 43, a clock loss detector 44, an AIS detector 45, and a path switching condition monitor 46. The pointer byte monitor 41 receives the transmission signal and finds the beginning of each main signal frame by checking its pointer bytes. With each frame identified, the pointer byte monitor 41 extracts the main signal frames from the received transmission signal stream. The pointer byte monitor 41 passes the results to the demapping unit 42, allowing it to produce a frame pulse signal FP and an enable pulse signal ENP. The enable pulse signal ENP indicates which part of the received signal contains valid data. The demapping unit 42 then supplies these pulse signals to the signal retiming unit 43 and path switching condition monitor 46, together with the main signals.

The signal retiming unit 43 converts the rate of the received main signals by retiming them with an internal clock of the device, which is referred to as the "system clock." More specifically, the signal retiming unit 43 serves as a memory to which the main signal data is written with the transmission clock, and from which the same data is read out with the system clock.

The clock loss detector 44 monitors the transmission clock status. If the clock is stuck at zero or one for a prescribed period, the clock loss detector 44 regards it as a clock loss fault, thus generating a clock loss alarm signal ARM. The AIS detector 45, on the other hand, monitors the main signal to detect an AIS pattern. When this defect pattern is received, the AIS detector 45 generates an AIS alarm signal.

According to the present invention, the AIS detector 45 comprises an AIS activation unit (not shown in FIG. 3) to enable the AIS detector 45 to assert the AIS signal when the transmission clock is lost. More specifically, the clock loss alarm ARM signal is routed to the AIS activation unit, which causes it to forcibly activate the AIS signal. The west-channel AIS detector 55 also has this feature.

The path switching condition monitor 46 observes the condition of the main signal. The observed main signal condition (e.g., parity error) is passed to a PSW controller 33 (described later).

Referring to FIG. 4, the remaining part of the non-interruptive protection switching device 1a is shown. In addition to the east and west channel transmission controllers 10 and 20, the proposed non-interruptive protection switching device 1a comprises the following elements: a read controller 31, a reference phase counter 32, a path switch (PSW) controller 33, a temporary electronic wallet data writing means 34, and an output controller 35.

The reference phase counter 32 is a free-running multi-frame counter intended to generate a reference phase signal for use in identifying the main signal phase. The east-channel transmission controller 10 comprises: an east-channel signal storage unit 11, an east-channel multiframe synchronization controller 12, and an east-channel write controller 13. The east-channel signal storage unit 11 stores the data content of the incoming signal from the east channel. Receiving the data signal, frame count pulse signal FP, enable pulse signal ENP, and clock loss alarm signal ARM, the east-channel multiframe synchronization controller 12 detects multiframes being aligned in the main signal stream. The detected timing signal is referred to as the multiframe sync detection pulse signal. This signal is valid only when the main signal stream is in the normal state; otherwise, the east-channel multiframe synchronization controller 12 stops sending it.

According to the present invention, the east-channel multiframe synchronization controller 12 comprises an enable signal setting unit (not shown in FIG. 4). When the transmission clock is lost, this enable signal setting unit forcibly asserts the enable pulse signal ENP for the following reason. Without the transmission clock, the demapping unit 42 would stop generating the enable pulse signal ENP, meaning that it is fixed to the "disable" state. This would disrupt the operation of many functional blocks in the non-interruptive protection switching device 1a, since the signal ENP is used to control them. To avoid such a situation, according to the present invention, the clock loss alarm signal is routed to the east-channel multiframe synchronization controller 12, causing its integral enable signal setting unit to forcibly activate the enable pulse signal ENP. The west-channel multiframe synchronization controller 22 is configured in the same way.

The east-channel write controller 13 receives the multi-frame sync detection pulse signal and reference phase signal. During the time when the multiframe sync detection pulse signal is available, the east-channel write controller 13 produces a control pulse signal for writing frame data into the east-channel signal storage unit 11. This signal is referred to as the "multiframe write pulse" (WMFP). When the multiframe sync detection pulse signal is lost, the east-channel write controller 13 generates WMFP with its own free-running capability so as to control the data write operations to the east-channel signal storage unit 11. Further, the east-channel write controller 13 identifies the phase of the multiframe sync detection pulse signal with respect to the reference phase signal. This phase information, referred to as the "write phase data" D1, is passed to the read controller 31.

To control read access to the east- and west-channel signal storage units 11 and 21, the read controller 31 produces a pulse signal from the write phase data D1 and D2, which are supplied from the east- and west-channel write controllers 13 and 23. This control signal is called a "multiframe read pulse signal" (RMFP) and used to read out downstream data from the east- and west-channel signal storage units 11 and 21 simultaneously.

Based on the main signal conditions of the east and west transmission subsystems, the PSW controller 33 produces a signal to designate which channel to select, east or west. According to this selection signal, the path switch (PSW) 34 performs a switchover operation between the two channels. The output controller 35 receives the selected downstream transmission signal from the PSW 34 and passes it to the next stage when no alarm indication signal (AIS) is present. When any AIS condition is observed, the output controller 35 clamps the main signals to all ones.

Figure 5:
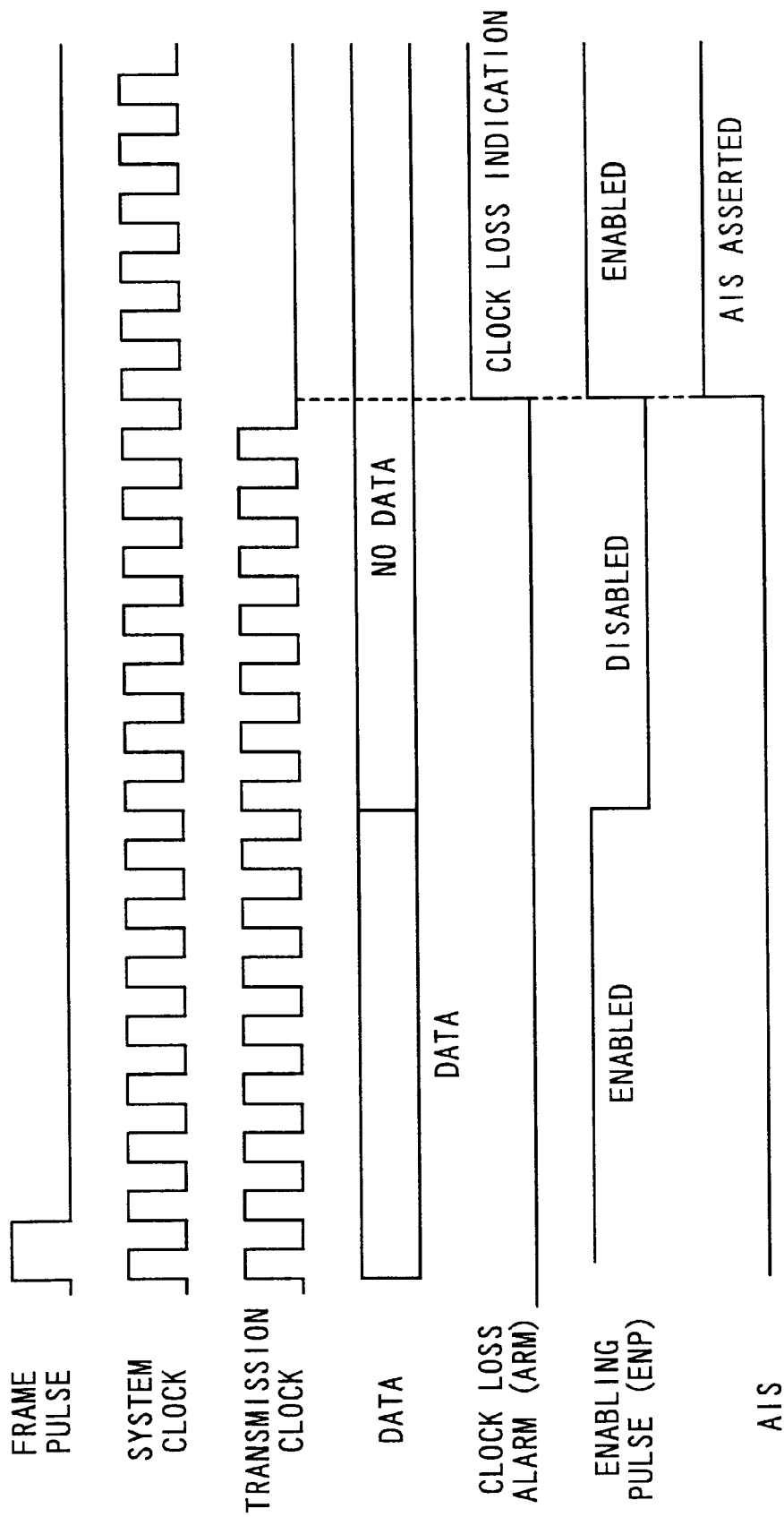
FIG. 5 is a diagram which shows the behavior of the alarm indication signal (AIS) and enable pulse signal when the transmission clock is lost.

FIG. 5 shows the behavior of the AIS and enable pulse signal when the transmission clock is lost. In this example, the clock loss alarm ARM goes high (i.e., asserted) for some reason. The enable pulse signal ENP is normally at a high level and turned to low when there is no data to be transported. According to the present invention, the assertion of the clock loss alarm ARM brings the enable pulse signal ENP to a high level, as well as activating the AIS signal.

Figure 6:
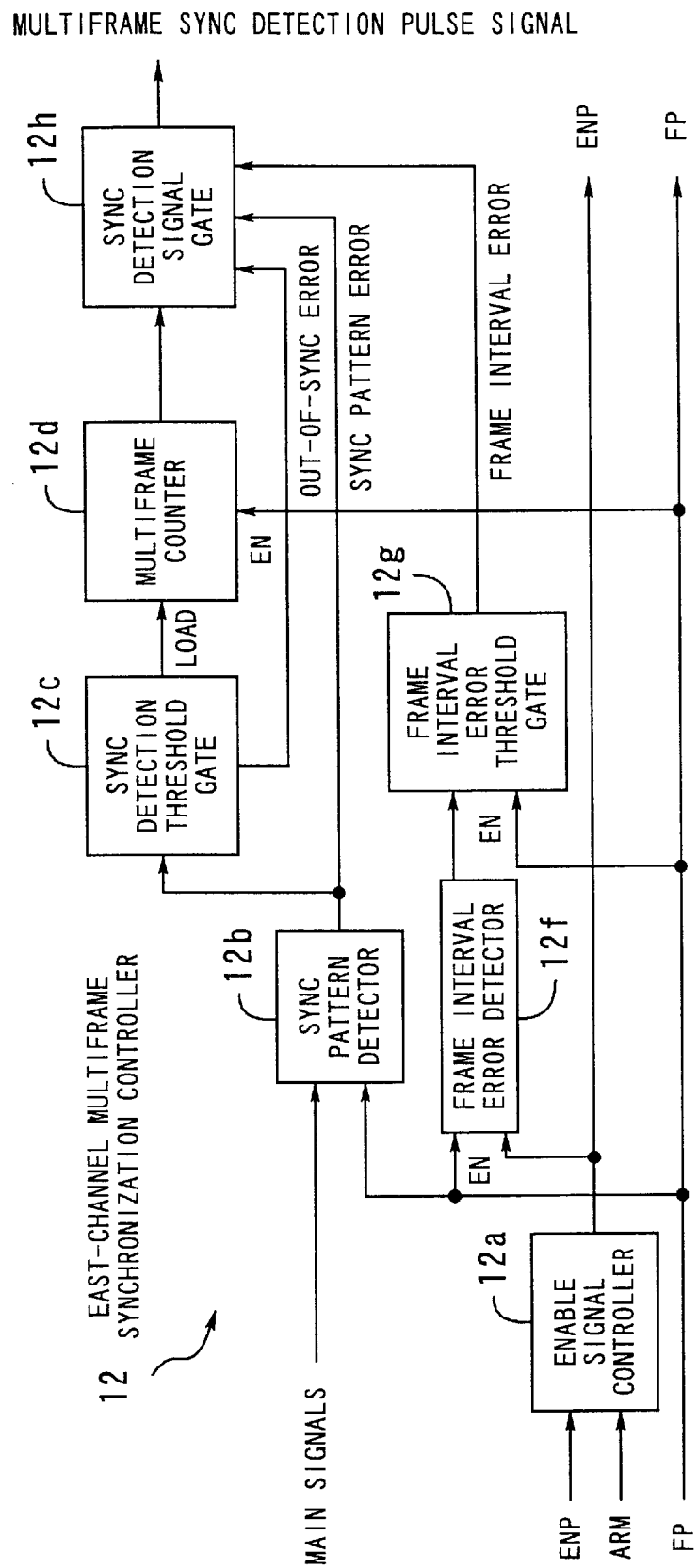
FIG. 6 is a diagram which shows the configuration of an east-channel multiframe synchronization controller according to the present invention.

Referring next to FIG. 6, the details of the east-channel multiframe synchronization controller 12 is shown. The controller 12 comprises the following components: an enable signal controller 12a, a sync pattern detector 12b, a sync detection threshold gate 12c, a multiframe counter 12d, a frame interval error detector 12f, a frame interval error threshold gate 12g, and a sync detection signal gate 12h.

The enable signal controller 12a normally passes the received enable pulse signal intact. When the clock loss alarm ARM is asserted, it forcibly activates the enable pulse signal ENP. For simplicity, this modified signal will be referred to as the enable pulse ENP in the following explanation.

The sync pattern detector 12b determines whether synchronization patterns embedded in the main signals are correctly received. If so, it outputs the frame pulse signal FP to the sync detection threshold gate 12c. If not, it sends a sync pattern error signal to the sync detection signal gate 12h.

The sync detection threshold gate 12c determines whether the detected frame pulses FP are received regularly. It supplies a sync detection signal to the next stage if the received pulses FP maintain a predetermined level of regularity. This regularity level may be set to, for example, three, meaning that three consecutive frame pulses FP observed within each multiframe interval will be interpreted as the sign of normality. If the frame pulse signal is determined to be normal, the sync detection threshold gate 12c supplies a sync detection signal to the multiframe counter 12d as its load command signal. If not, the sync detection threshold gate 12c sends an out-of-sync signal to the sync detection signal gate 12h.

The multiframe counter 12d receives the sync detection signal at its LOAD input, as well as accepting the frame pulse signal FP at its count enable (EN) input. The multiframe counter 12d serves as the source of the multiframe sync detection pulse signal discussed earlier.

The frame interval error detector 12f receives the enable pulse signal ENP at its enable (EN) input, determining whether the frame pulse signal FP becomes active at prescribed intervals. If any irregularity is found, the frame interval error detector 12f generates a frame interval error signal.

The frame interval error threshold gate 12g ascertains that the detected frame interval error is not a spurious one. More specifically, the frame interval error threshold gate 12g forwards the received interval error signal to the next stage only when the signal maintains a predetermined level of certainty. This certainty level may be set to, for example, three, which means that the frame interval error threshold gate 12g blocks the frame interval error signal to the sync detection signal gate 12h unless three consecutive instances of such errors are observed within a multiframe interval.

The sync detection signal gate 12h receives a multiframe sync detection pulse signal from the multiframe counter 12d, which is normally passed intact to the next stage. The provision of this multiframe sync detection pulse signal, however, will be stopped if the sync detection signal gate 12h receives any of the following error conditions: out-of-sync error, sync pattern error, and frame interval error.

The above-described structure of the east-channel multiframe synchronization controller 12 is also applicable to the west-channel multiframe synchronization controller 22.

Figure 7:
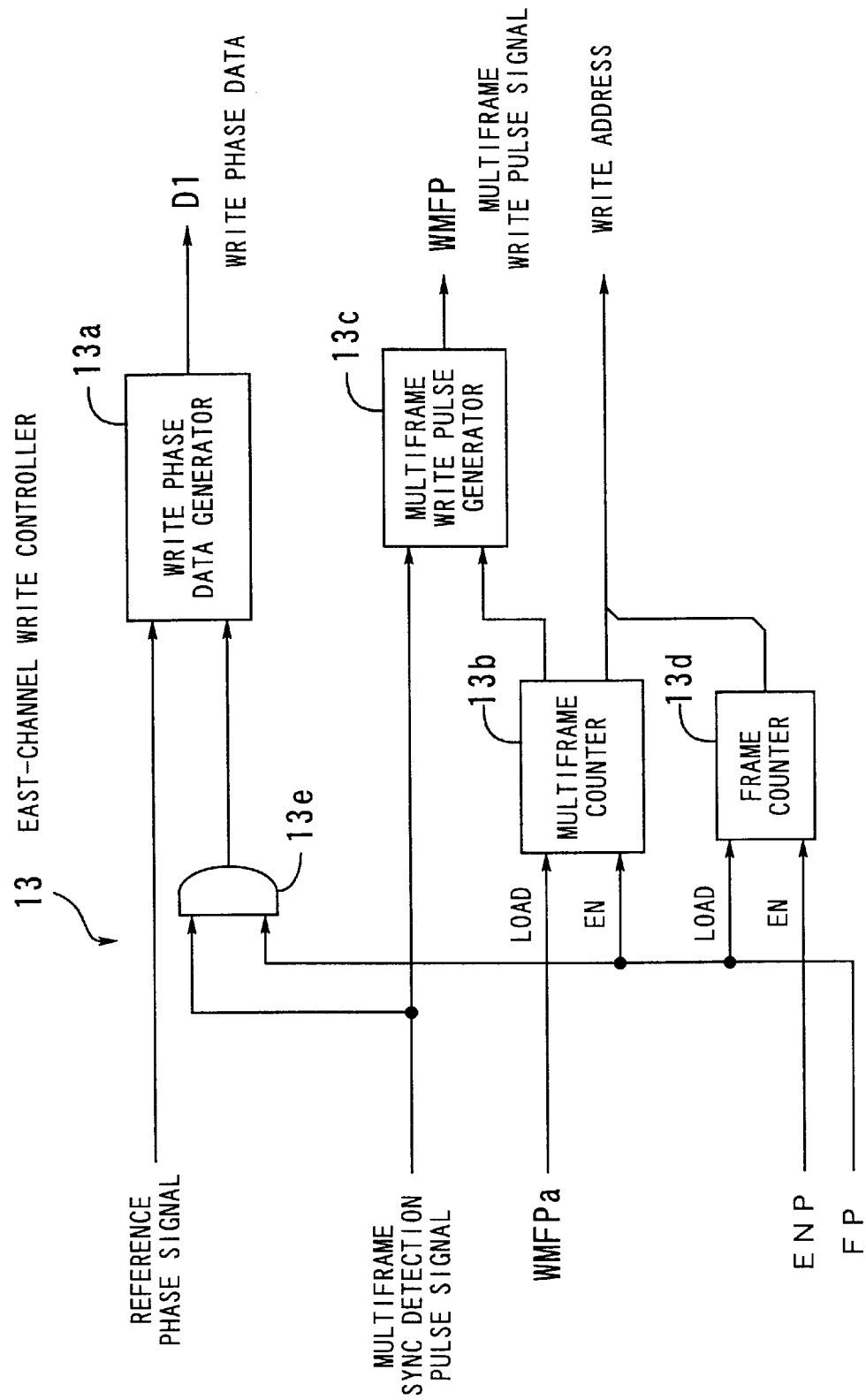
FIG. 7 is a diagram which shows the structure of an east-channel write controller.

Referring to FIG. 7, the detailed structure of an east-channel write controller 13 is shown. The east-channel write controller 13 comprises the following elements: a write phase data generator 13a, a multiframe counter 13b, a multiframe write pulse generator 13c, and a frame counter 13d.

The write phase data generator 13a is a device which latches the reference phase at specific time points. The latch timing is given by the AND operator 13e as the logical product of the multiframe sync detection pulse signal and frame count pulse signal FP. The result is sent to the read controller 31 as write phase data D1.

The multiframe counter 13b is a free-running counter which serves as the source of multiframe write pulses. Besides accepting the frame pulse signal FP at its count enable (EN) input, the multiframe counter 13b receives a multiframe write pulse signal WMFPa at its LOAD input. This WMFPa is what is supplied to a multiplex mode controller 60 (described later). The produced multiframe write pulses are supplied to the multiframe write pulse generator 13c. With its logical OR operator, the multiframe write pulse generator 13c combines them with the multiframe sync detection pulse signal supplied from the east-channel multiframe synchronization controller 12. The resultant signal is referred to as a multiframe write pulse signal WMFP. The frame counter 13d, on the other hand, receives frame pulse signal FP at its LOAD input, as well as accepting the enable pulse signal ENP at its count enable (EN) input. The count values of the multiframe counter 13b and frame counter 13d are supplied to the east-channel signal storage unit 11 as the write address.

As seen from FIGS. 6 and 7, the sync detection signal gate 12h is configured to stop the multiframe sync detection pulse signal by making it to the low level, when the main signal stream falls into a faulty condition (e.g., out-of-sync, sync pattern error, frame interval error). This causes the write phase data generator 13a to hold the last valid write phase data D1. Further, the generation of the multiframe write pulse signal WMFP is switched to free-running mode. Accordingly, the operation of the read controller 31 will never be disturbed by the main signal fault. Although the incoming signal condition may vary as such, the present invention permits the output signal phase to be maintained in a stable state, thus providing more robust non-interruptive protection switching functions.

The next section will describe a multiplex mode controller according to the present invention. In the SONET/SDH terminology, the term "concatenation" refers to a procedure whereby a multiplicity of virtual containers is associated one with another. This results in a combined capacity that can be used as a single container across which bit sequence integrity is maintained. The multiplex mode controller of the present invention is intended to handle such concatenated payloads. The following explanation presents an example system which support various bandwidths, from STS-1 providing a capacity of 50 Mbps to STS-12c containing twelve STS-1 VCs. While only the east channel will be discussed below, the same can be apply to the west channel.

Figure 8:
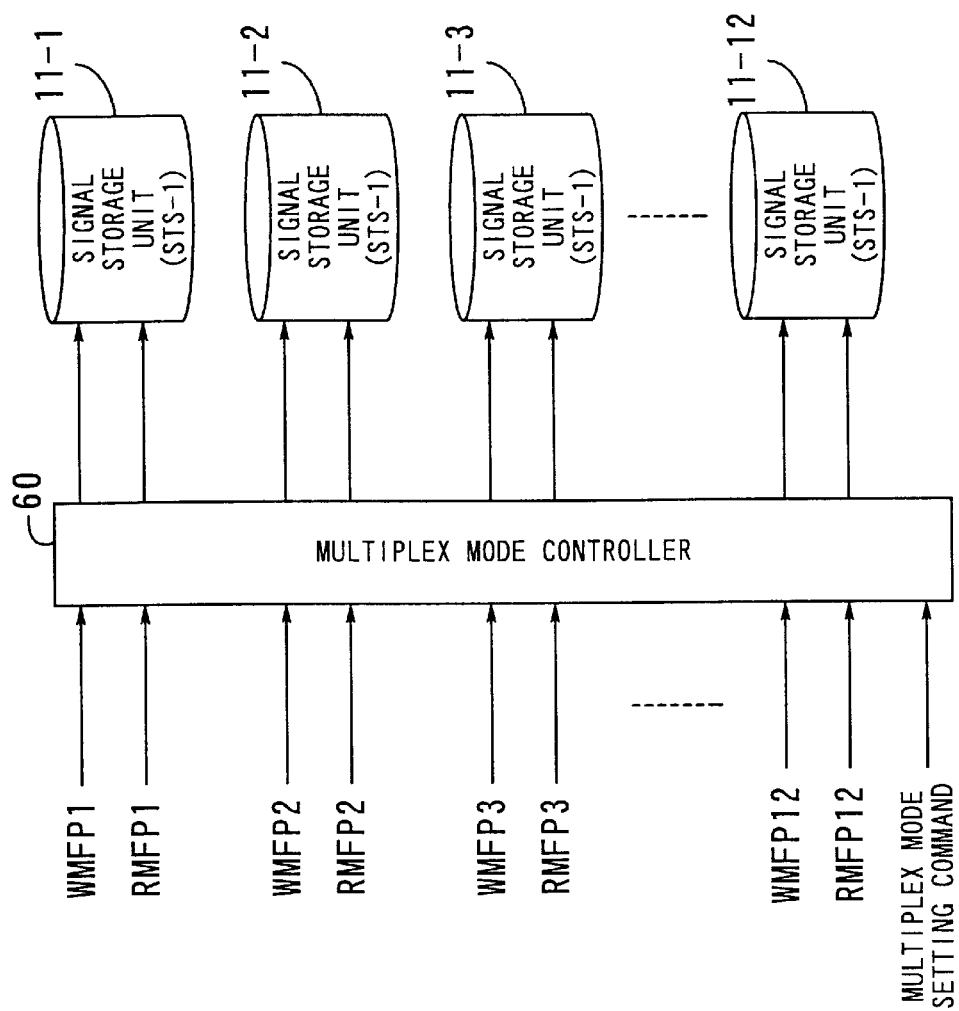
FIG. 8 is a diagram which shows a multiplex mode controller according to the present invention.

FIG. 8 shows a multiplex mode controller of the present invention. The illustrated controller 60 us coupled to twelve signal storage units 11-1 to 11-12, which are what has been described as the east-channel signal storage unit 11. Since each unit supports a single STS-1 signal, the twelve units 11-1 to 11-12 as a whole can provide data capacity for up to STS-12c. To this end, the system employs twelve sets of east-channel termination units 40, east-channel transmission controllers 10, and read controllers 31, although not shown in FIG. 8. The twelve east-channel write controllers 13 provide twelve multiframe write pulse signals WMFP1 to WMFP12, while twelve east-channel read controllers 31 produce twelve multiframe read pulse signals RMFP1 to RMFP12. Those signals are entered to the multiplex mode controller 60. The multiplex mode controller 60 controls the mode of multiplexing operations according to a mode setting command supplied from an external source.

Figure 9:
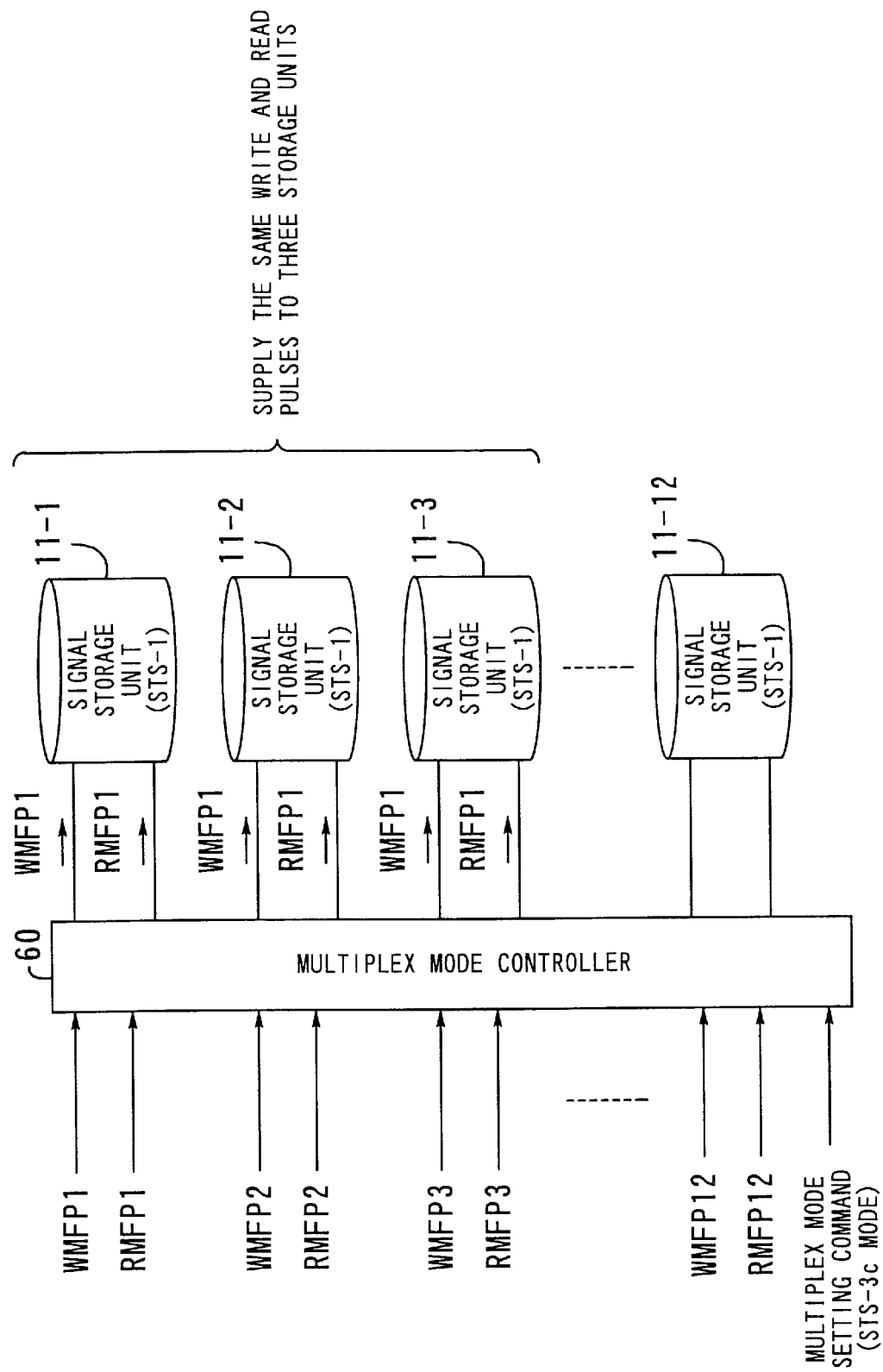
FIG. 9 is a diagram which shows the operation of the multiplex mode controller in STS-3c mode.

FIG. 9 shows how the proposed controller 60 operates in STS-3c mode. When the STS-3c mode is specified, only one set of the multiframe read/write pulse signals are appropriate. Suppose, for example, that they are the multiframe write pulse signal WMFP1 and multiframe read pulse signal RMFP1. The multiplex mode controller 60 selects these two signals WMFP1 and RMFP1 out of the twelve sets of multiframe write pulse signals WMFP1 to WMFP12 and multiframe read pulse signals RMFP1 to RMFP12. The selected signals WMFP1 and RMFP1 are used to write and read the signal storage units 11-1 to 11-3.

Figure 10:
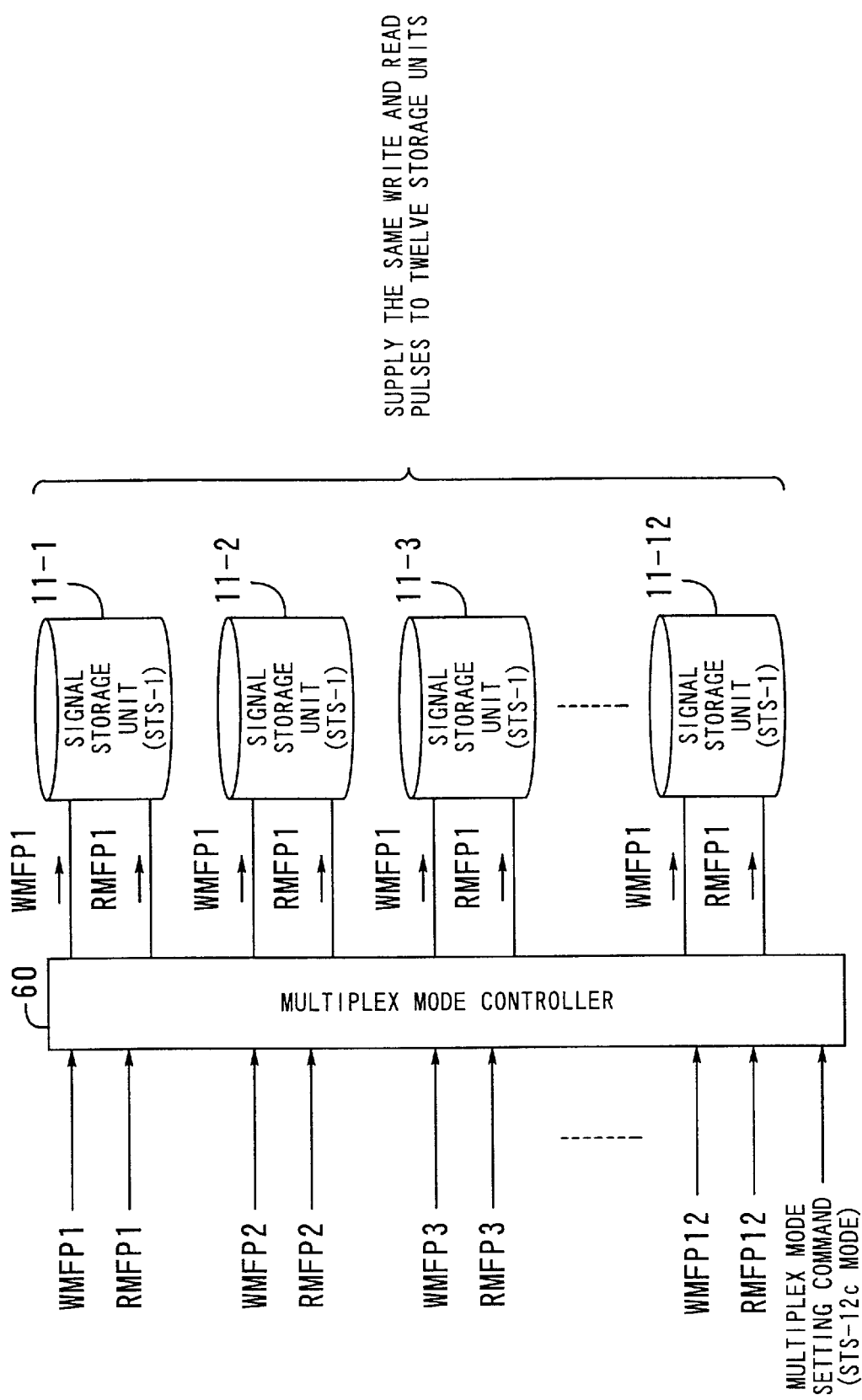
FIG. 10 is a diagram which shows the operation of the multiplex mode controller in STS-12c mode.

FIG. 10 shows how the proposed controller 60 operates in STS-12c mode. When the STS-12c mode is specified, only one set of the multiframe read/write pulse signals are appropriate. Suppose, for example, that they are the multiframe write pulse signal WMFP1 and multiframe read pulse signal RMFP1. The multiplex mode controller 60 selects these two signals WMFP1 and RMFP1 out of the twelve sets of multiframe write pulse signals WMFP1 to WMFP12 and multiframe read pulse signals RMFP1 to RMFP12. The selected signals WMFP1 and RMFP1 are used to write and read the signal storage units 11-1 to 11-12.

Figure 11:
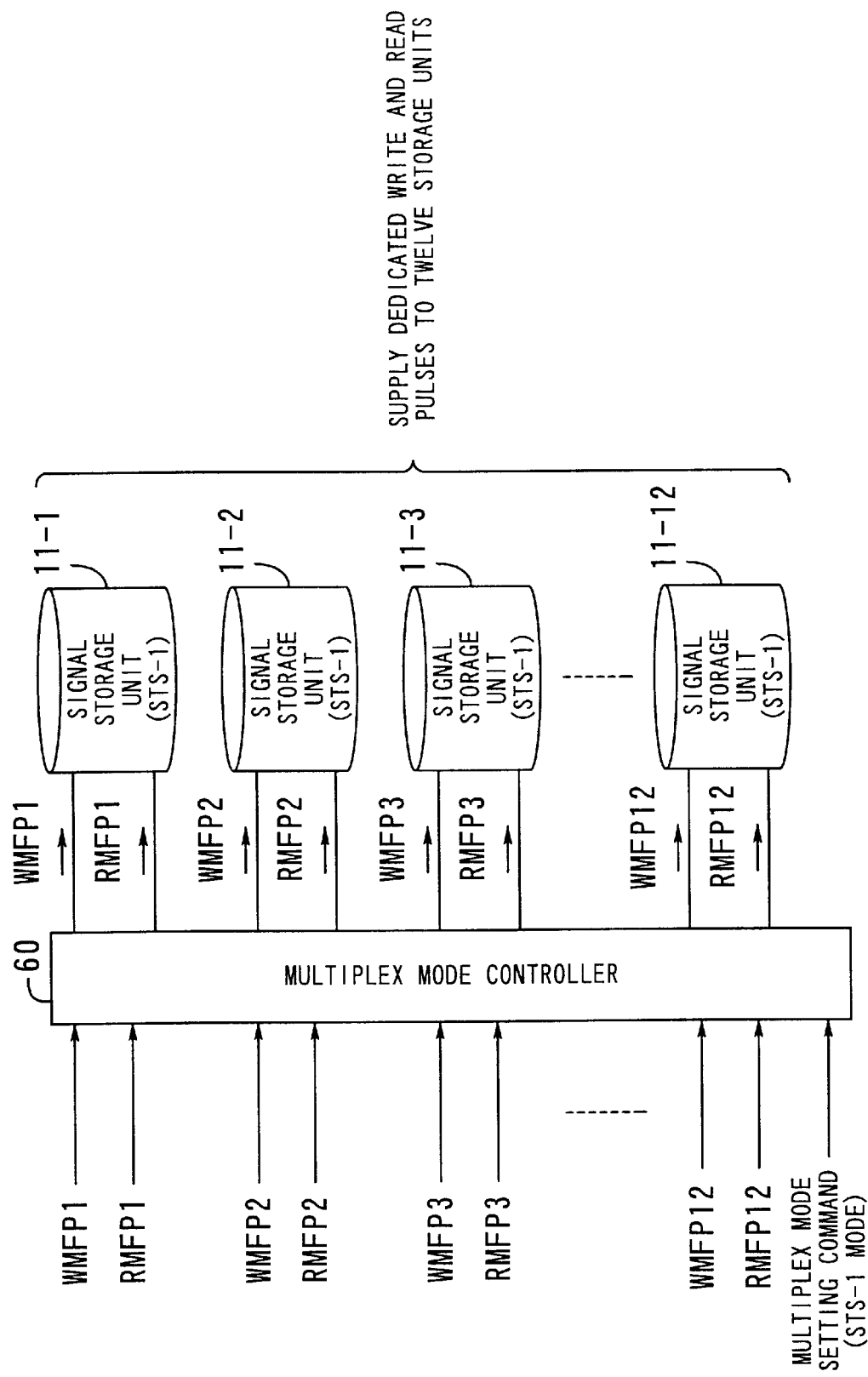
FIG. 11 is a diagram which shows the operation of the multiplex mode controller in STS-1 mode.

FIG. 11 shows how the proposed controller 60 operates in STS-1 mode. When the STS-1 mode is specified, the multiplex mode controller 60 supplies the signal storage units 11-1 to 11-12 with their respective multiframe read/write pulse signals individually. More specifically, the multiplex mode controller 60 provides the multiframe write pulse signal WMFP1 and multiframe read pulse signal RMFP1 to the signal storage unit 11-1. Likewise, it sends the multiframe write pulse signal WMFP2 and multiframe read pulse signal RMFP2 to the signal storage unit 11-2. The multiplex mode controller 60 configures the remaining signal storage units 11-3 to 11-12 similarly.

As seen from the above examples, the multiplex mode controller of the present invention can handle concatenated payloads in various multiplex modes. Write and read operations to the signal storage units are controlled flexibly, without the need for complex circuitry.

Figure 12:
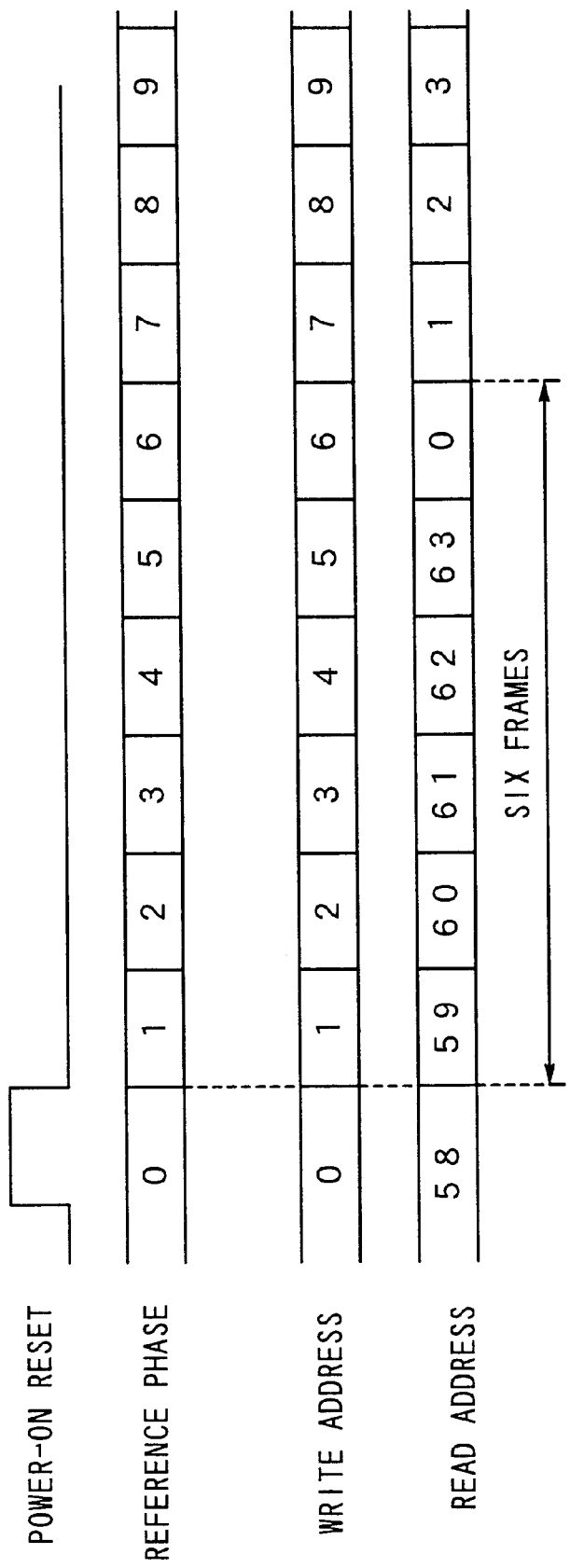
FIGS. 12 and 13 are diagrams which explain how the proposed device avoids read and write phases from overlapping.
Figure 13:
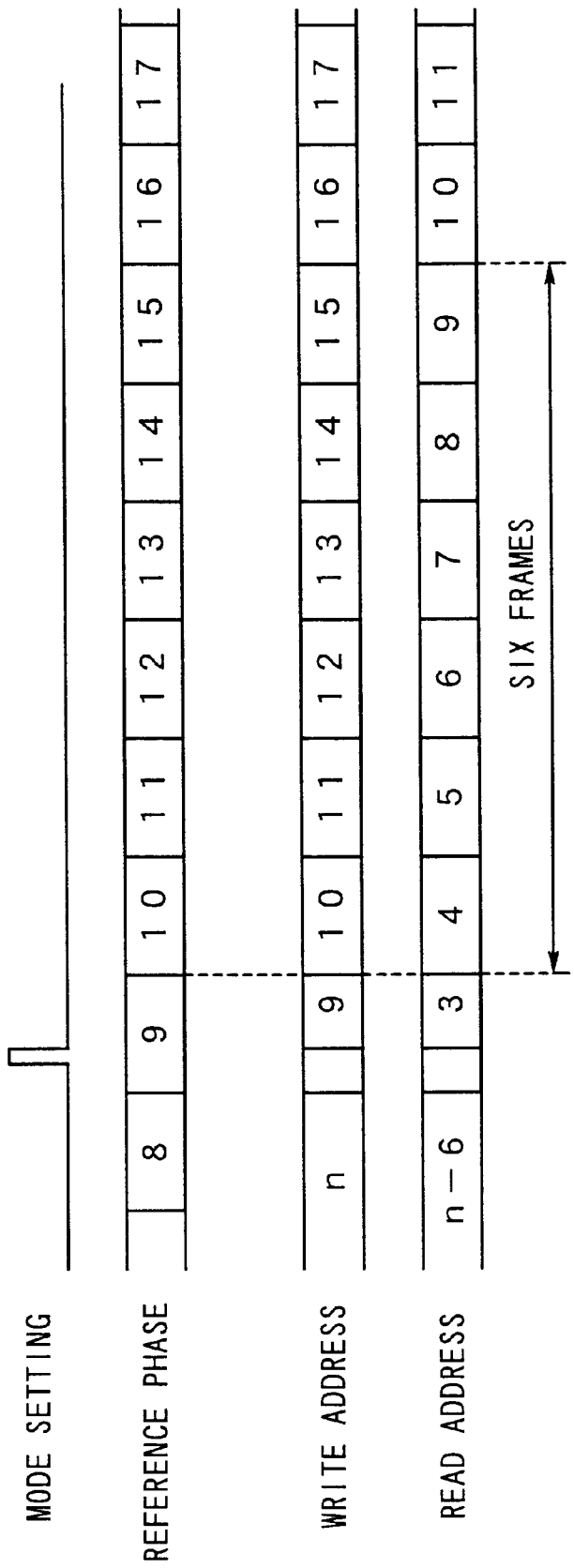

Referring to FIGS. 12 and 13, the next section will describe how the present invention avoids the overlap of write and read phases. According to the present invention, the proposed non-interruptive protection switching device comprises phase overlap prevention units (not shown), one for each of the east and west facilities. When the device is powered up, or when the multiplex mode is redefined, this phase overlap prevention unit controls the write and read access to/from the east- and west-channel signal storage units 11 and 21 in order to ensure that the write cycle to each address will always precede the read cycle to the same address (hence, no phase overlap will occur).

Figure 14:
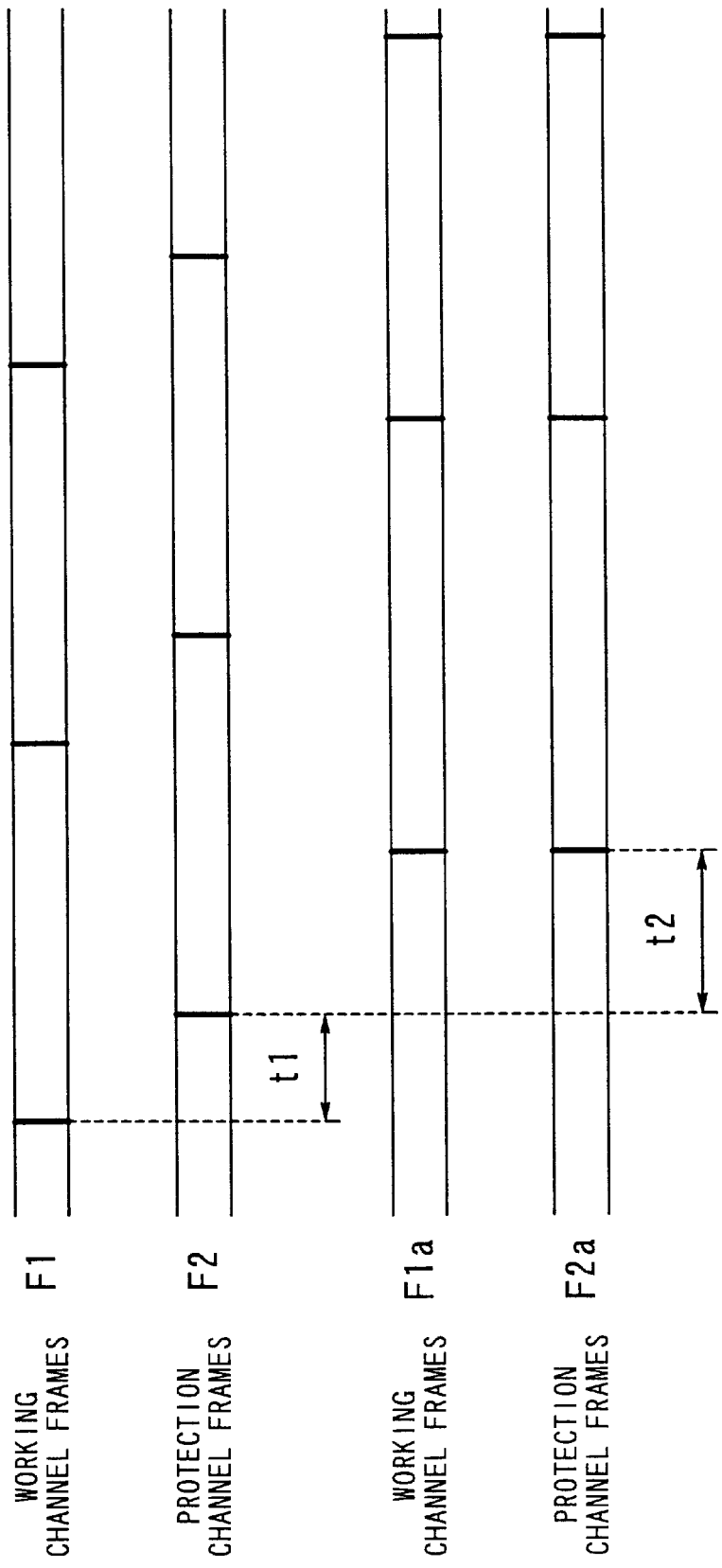
FIG. 14 is a diagram which briefly describes how a non-interruptive switchover operation is performed.

FIG. 12 shows the behavior of the proposed device in its power-up process, where the read and write phases are controlled appropriately to avoid overlap. The east-channel signal storage unit 11 is programmed in such a way that each frame is read out with a delay time of six frame intervals, with respect to the write operation of that frame. This delay should be taken into consideration when determining the time parameter t2 explained in FIG. 14.

Referring to the timing diagram of FIG. 12, the reference phase signal and the write address start with a value "1" when the power-on reset is removed. That is, these two are in phase with each other. The read address, on the other hand, is set by the phase overlap prevention unit in such a way that it will start with "59" This means that the read phase goes six frames behind the write phase, preventing the read and write cycles on the same address from racing.

FIG. 13 is another timing diagram showing the phase overlap prevention. This diagram depicts the behavior of the proposed non-interruptive protection switching device when the multiplex mode is set to a new one. Suppose that the east-channel signal storage unit 11 is programmed such that each frame is read out with a delay time of six frame intervals with respect to the write operation of that frame. When a mode setting command is given, the phase overlap prevention unit renders the write address in phase with the current reference phase. In the example of FIG. 13, the write address is set to nine, whereas its previous value is n (integer). The read address, on the other hand, is changed from (n–6) to three, which is the result of subtracting six from the new write address. This setting ensures that the read phase keeps six frames behind the write phase, preventing the read and write cycles on the same address from racing.

As seen from the above two examples, the present invention avoids the overlap of write and read access to the same address by employing phase overlap prevention units, which works when the device is powered up or when the multiplex mode is redefined. This mechanism ensures the correct read and write operations of the signal storage units.

The above discussion will now be summarized below. According to the present invention, the non-interruptive protection switching device is configured to produce write pulses for the working- and protection-channel signal storage units with its local free-running timebase, while stopping the provision of multiframe sync detection pulses when the main signals are in a faulty condition. This feature permits the device to perform protection switching in a more reliable and robust way. Even a sudden variation occurs in the phase of incoming frames would not affect the read control circuit of the device. The network system according to the present invention employs such a non-interruptive protection switching device at each transmission unit, thus providing more reliable and robust protection switching functions.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A non-interruptive protection switching device which switches data traffic from working channels to protection channels, comprising:

(a) a working-channel transmission controller comprising:

working-channel signal storage means for storing data signals received through a working channel, the data signals containing working-channel main signals for a multiframe interval, working-channel multiframe synchronization control means for monitoring multiframe patterns in the working-channel main signals to detect a multiframe synchronization timing thereof, providing a working-channel multiframe sync detection pulse signal when the working-channel main signals are in a normal condition, and stopping the provision of the working-channel multiframe sync detection pulse signal when the working-channel main signals fall into a faulty condition, and working-channel write control means for controlling write access to said working-channel signal storage means by providing a working-channel write pulse signal therefor, and producing working-channel write phase data by identifying a phase difference of the detected multiframe synchronization timing with respect to a reference phase signal, wherein the working-channel write pulse signal is produced from the multiframe sync detection pulse signal when the working-channel multiframe sync detection pulse signal is available, or from a free-running timebase when the working-channel multiframe sync detection pulse signal is stopped;

(b) a protection-channel transmission controller comprising:

protection-channel signal storage means for storing data signals received through a protection channel, the data signals containing protection-channel main signals for a multiframe interval, protection-channel multiframe synchronization control means for monitoring multiframe patterns in the protection-channel main signals to detect a multiframe synchronization timing thereof, providing a protection-channel multiframe sync detection pulse signal when the protection-channel main signals are in a normal condition, and stopping the provision of the protection-channel multiframe sync detection pulse signal when the protection-channel main signals fall into a faulty condition, and protection-channel write control means for controlling write access to said protection-channel signal storage means by providing a protection-channel write pulse signal therefor, and producing protection-channel write phase data by identifying a phase difference of the detected multiframe synchronization timing with respect to a reference phase signal, wherein the protection-channel write pulse signal is produced from the multiframe sync detection pulse signal when the protection-channel multiframe sync detection pulse signal is available, or from a free-running timebase when the protection-channel multiframe sync detection pulse signal is stopped; and (c) read control means for producing a read pulse signal from the working-channel write phase data and the protection-channel write phase data, and based on the produced read pulse signal, reading out the stored data signals simultaneously from said working-channel signal storage means and said protection-channel signal storage means for use in downstream transmission.

2. The non-interruptive protection switching device according to claim 1, wherein said working-channel multiframe synchronization control means stops the provision of the working-channel multiframe sync detection pulse signal when at least one of an out-of-sync error, a multiframe pattern error, and a frame interval error is found in the working-channel main signals.

3. The non-interruptive protection switching device according to claim 1, wherein said protection-channel multiframe synchronization control means stops the provision of the protection-channel multiframe sync detection pulse signal when at least one of an out-of-sync error, a multiframe pattern error, and a frame interval error is found in the protection-channel main signals.

4. The non-interruptive protection switching device according to claim 1, further comprising enable signal activating means for forcibly asserting an enable pulse signal when a clock loss error is detected, the enable pulse signal indicating valid data part of the received main signals.

5. The non-interruptive protection switching device according to claim 1, wherein:
the data traffic is carried on a concatenated signal containing a plurality of data units; and
said each non-interruptive protection switching device comprises as many sets of said working- and protection-channel transmission controllers and read control means as the number of data units contained in the concatenated signal.

6. The non-interruptive protection switching device according to claim 5, further comprising multiplex mode control means, responsive to a command to set a specific multiplex mode setting command, for selecting a multiframe write pulse signal and a multiframe read pulse signal that are required in the specified multiplex mode, and supplying the selected signals to at least one set of said working-channel and protection-channel transmission controllers that are required in the specified multiplex mode.

7. The non-interruptive protection switching device according to claim 1, further comprising phase overlap preventing means for preventing write access to each address of said working-channel and protection-channel signal storage means from overlapping with read access therefrom.

8. A non-interruptive protection switching device which switches data traffic from working channels to protection channels, comprising:

(a) a working-channel transmission controller comprising:
working-channel signal storage means for storing data signals received through a working channel, the data signals containing working-channel main signals for a multiframe interval and an alarm indication signal,
protection-channel multiframe synchronization control means for monitoring multiframe patterns in the protection-channel main signals to detect a multiframe synchronization timing thereof, providing a protection-channel multiframe sync detection pulse signal when the protection-channel main signals are in a normal condition, and stopping the provision of the protection-channel multiframe sync detection pulse signal when the protection-channel main signals fall into a faulty condition,
working-channel write control means for controlling write access to said working-channel signal storage means by providing a working-channel write pulse signal therefor, and producing working-channel write phase data by identifying a phase difference of the detected multiframe synchronization timing with respect to a reference phase signal, wherein the working-channel write pulse signal is produced from the multiframe sync detection pulse signal when the working-channel multiframe sync detection pulse signal is available, or from a free-running timebase when the working-channel multiframe sync detection pulse signal is stopped, and
working-channel alarm indication signal activating means for forcibly activates the alarm indication signal when a clock loss error is detected on the working channel;

(b) a protection-channel transmission controller comprising:
protection-channel signal storage means for storing data signals received through a working channel, the data signals containing protection-channel main signals for a multiframe interval and a protection-channel alarm indication signal,
protection-channel multiframe synchronization control means for monitoring multiframe patterns in the protection-channel main signals to detect a multiframe synchronization timing thereof, providing a protection-channel multiframe sync detection pulse signal when the protection-channel main signals are in a normal condition, and stopping the provision of the protection-channel multiframe sync detection pulse signal when the protection-channel main signals fall into a faulty condition,
protection-channel write control means for controlling write access to said protection-channel signal storage means by providing a protection-channel write pulse signal therefor, and producing protection-channel write phase data by identifying a phase difference of the detected multiframe synchronization timing with respect to a reference phase signal, wherein the protection-channel write pulse signal is produced from the multiframe sync detection pulse signal when the protection-channel multiframe sync detection pulse signal is available, or from a free-running timebase when the protection-channel multiframe sync detection pulse signal is stopped, and
protection-channel alarm indication signal activating means for forcibly activates the alarm indication signal when a clock loss error is detected on the protection channel; and (c) read control means for producing a read pulse signal from the working-channel write phase data and the protection-channel write phase data, and based on the produced read pulse signal, reading out the stored data signals simultaneously from said working-channel signal storage means and said protection-channel signal storage means for use in downstream transmission.

9. A network system which employs east and west transmission subsystems with non-interruptive protection switching capabilities, comprising:
 (a) a plurality of transmission units
 (b) a transmission medium which interconnects said plurality of transmission units in ring form; and
 (c) a plurality of non-interruptive protection switching devices, one in each of said transmission units, each non-interruptive protection switching device comprising:
  (c1) an east-channel transmission controller comprising:
   east-channel signal storage means for storing data signals received through an east channel, the data signals containing east-channel main signals for a multiframe interval,
   east-channel multiframe synchronization control means for monitoring multiframe patterns in the east-channel main signals to detect a multiframe synchronization timing thereof, providing an east-channel multiframe sync detection pulse signal when the east-channel main signals are in a normal condition, and stopping the provision of the east-channel multiframe sync detection pulse signal when the east-channel main signals fall into a faulty condition, and
   east-channel write control means for controlling write access to said east-channel signal storage means by providing an east-channel write pulse signal therefor, and producing east-channel write phase data by identifying a phase difference of the detected multiframe synchronization timing with respect to a reference phase signal, wherein the east-channel write pulse signal is produced from the multiframe sync detection pulse signal when the east-channel multiframe sync detection pulse signal is available, or from a free-running timebase when the east-channel multiframe sync detection pulse signal is stopped,
  (c2) a west-channel transmission controller comprising:
   west-channel signal storage means for storing data signals received through a west channel, the data signals containing west-channel main signals for a multiframe interval,
   west-channel multiframe synchronization control means for monitoring multiframe patterns in the west-channel main signals to detect a multiframe synchronization timing thereof, providing a west-channel multiframe sync detection pulse signal when the west-channel main signals are in a normal condition, and stopping the provision of the west-channel multiframe sync detection pulse signal when the west-channel main signals fall into a faulty condition, and
   west-channel write control means for controlling write access to said west-channel signal storage means by providing a west-channel write pulse signal therefor, and producing west-channel write phase data by identifying a phase difference of the detected multiframe synchronization timing with respect to a reference phase signal, wherein the west-channel write pulse signal is produced from the multiframe sync detection pulse signal when the west-channel multiframe sync detection pulse signal is available, or from a free-running timebase when the west-channel multiframe sync detection pulse signal is stopped, and
  (c3) read control means for producing a read pulse signal from the east-channel write phase data and the west-channel write phase data, and based on the produced read pulse signal, reading out the stored data signals simultaneously from said east-channel signal storage means and said west-channel signal storage means for use in downstream transmission.

10. The network system according to claim 9, wherein said east-channel multiframe synchronization control means stops the provision of the protection-channel multiframe sync detection pulse signal when at least one of an out-of-sync error, a multiframe pattern error, and a frame interval error is found in the east-channel main signals.

11. The network system according to claim 9, wherein said west-channel multiframe synchronization control means stops the provision of the protection-channel multiframe sync detection pulse signal when at least one of an out-of-sync error, a multiframe pattern error, and a frame interval error is found in the west-channel main signals.

12. The network system according to claim 9, further comprising enable signal activating means for forcibly asserting an enable pulse signal when a clock loss error is detected, the enable pulse signal indicating valid data part of the received main signals.

13. The network system according to claim 9, wherein:
 the data traffic is carried on a concatenated signal containing a plurality of data units; and
 said each non-interruptive protection switching device comprises as many sets of said east- and west-channel transmission controllers and read control means as the number of data units contained in the concatenated signal.

14. The network system according to claim 13, further comprising multiplex mode control means, responsive to a command to set a specific multiplex mode setting command, for selecting a multiframe write pulse signal and a multiframe read pulse signal that are required in the specified multiplex mode, and supplying the selected signals to at least one set of said east- and west-channel transmission controllers that are required in the specified multiplex mode.

15. The network system according to claim 9, further comprising phase overlap preventing means for preventing a write operation to each address of said east- and west-channel signal storage means from overlapping with a read operation therefrom.

16. A network system which employs east and west transmission subsystems with non-interruptive protection switching capabilities, comprising:
 (a) a plurality of transmission units;
 (b) a transmission medium which interconnects said plurality of transmission units in ring form; and
 (c) a plurality of non-interruptive protection switching devices, one in each of said transmission units, each non-interruptive protection switching device comprising:
  (c1) an east-channel transmission controller comprising:
   east-channel signal storage means for storing data signals received through an east channel, the data signals containing east-channel main signals for a multiframe interval and an east-channel alarm indication signal,
   east-channel multiframe synchronization control means for monitoring multiframe patterns in the east-channel main signals to detect a multiframe synchronization timing thereof, providing an east-channel multiframe sync detection pulse signal when the east-channel main signals are in a normal condition, and stopping the provision of the east-channel multiframe sync detection pulse signal when the east-channel main signals fall into a faulty condition, east-channel write control means for controlling write access to said east-channel signal storage means by providing an east-channel write pulse signal therefor, and producing east-channel write phase data by identifying a phase difference of the detected multiframe synchronization timing with respect to a reference phase signal, wherein the east-channel write pulse signal is produced from the multiframe sync detection pulse signal when the east-channel multiframe sync detection pulse signal is available, or from a free-running timebase when the east-channel multiframe sync detection pulse signal is stopped, and east-channel alarm indication signal activating means for forcibly activates the alarm indication signal when a clock loss error is detected on the east channel, (c2) a west-channel transmission controller comprising:

west-channel signal storage means for storing data signals received through a west channel, the data signals containing west-channel main signals for a multiframe interval and a west-channel alarm indication signal, west-channel multiframe synchronization control means for monitoring multiframe patterns in the west-channel main signals to detect a multiframe synchronization timing thereof, providing a west-channel multiframe sync detection pulse signal when the west-channel main signals are in a normal condition, and stopping the provision of the west-channel multiframe sync detection pulse signal when the west-channel main signals fall into a faulty condition, west-channel write control means for controlling write access to said west-channel signal storage means by providing a west-channel write pulse signal therefor, and producing west-channel write phase data by identifying a phase difference of the detected multiframe synchronization timing with respect to a reference phase signal, wherein the west-channel write pulse signal is produced from the multiframe sync detection pulse signal when the west-channel multiframe sync detection pulse signal is available, or from a free-running timebase when the west-channel multiframe sync detection pulse signal is stopped, and west-channel alarm indication signal activating means for forcibly activates the alarm indication signal when a clock loss error is detected on the west channel, and (c3) read control means for producing a read pulse signal from the east-channel write phase data and the west-channel write phase data, and based on the produced read pulse signal, reading out the stored data signals simultaneously from said east-channel signal storage means and said west-channel signal storage means for use in downstream transmission.

\* \* \* \* \*